United States Patent [19]

Clegg

[11] 4,080,733
[45] Mar. 28, 1978

[54] WIRE CUTTING PLIERS

[76] Inventor: John E. Clegg, 2320 Keystone Dr., Orlando, Fla. 32806

[21] Appl. No.: 712,422

[22] Filed: Aug. 5, 1976

[51] Int. Cl.² ............................................. B26B 13/26
[52] U.S. Cl. ........................................ 30/102; 30/237
[58] Field of Search ................ 30/101, 102, 192, 250, 30/92, 94, 240, 251, 237, 239

[56] References Cited

U.S. PATENT DOCUMENTS

| 860,711 | 7/1907 | Vosper | 30/94 |
|---|---|---|---|
| 1,034,345 | 7/1912 | Compton | 30/101 |
| 1,107,511 | 8/1914 | Gallagher | 30/101 |
| 2,230,030 | 1/1941 | Finch | 30/102 |
| 2,502,700 | 4/1950 | Capewell | 30/102 |
| 2,725,774 | 12/1955 | Tekse | 30/102 |

Primary Examiner—Jimmy C. Peters

[57] ABSTRACT

This invention relates to linesmen pliers, bolt cutters and similar cutting tools which require a mechanical advantage. Durability and long life are prime features of the design. Disk blades are used, and these have cutting edges of two inches circumference, which is about four times the cutting length of conventional straight-blade cutting pliers. The blades are offset and overlapped, thus eliminating separation that occurs with wear. Also, the blades are replaceable; thus the tool can continue to serve the purpose for which it was made long after the original blades become too dull to cut.

As to mechanical advantage, first and second class leverage and a double toggle action are used. The combination of these actions exceeds by far the mechanical advantage of conventional cutting pliers.

4 Claims, 5 Drawing Figures

U.S. Patent     March 28, 1978     4,080,733
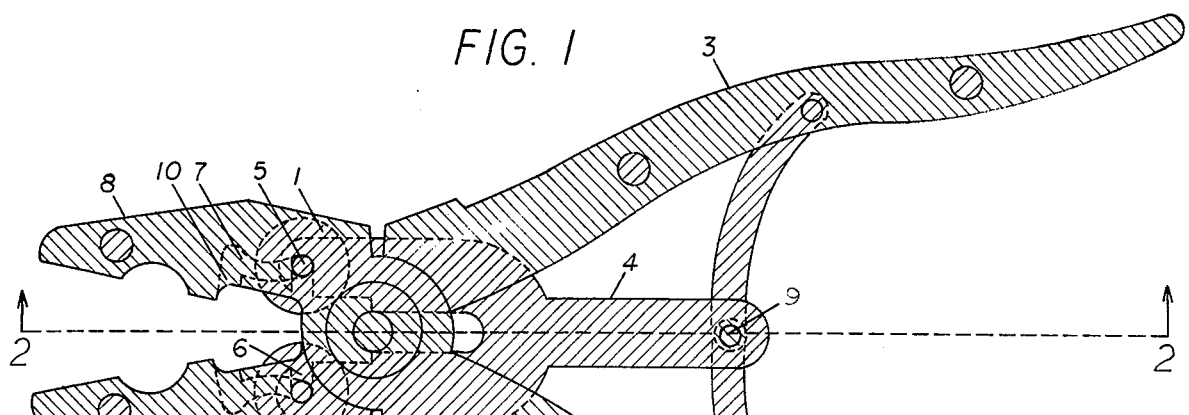
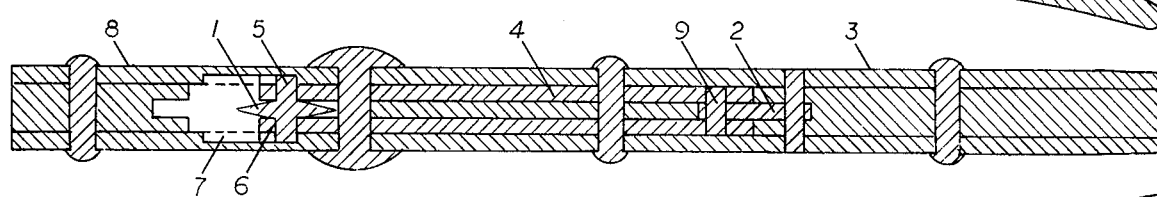
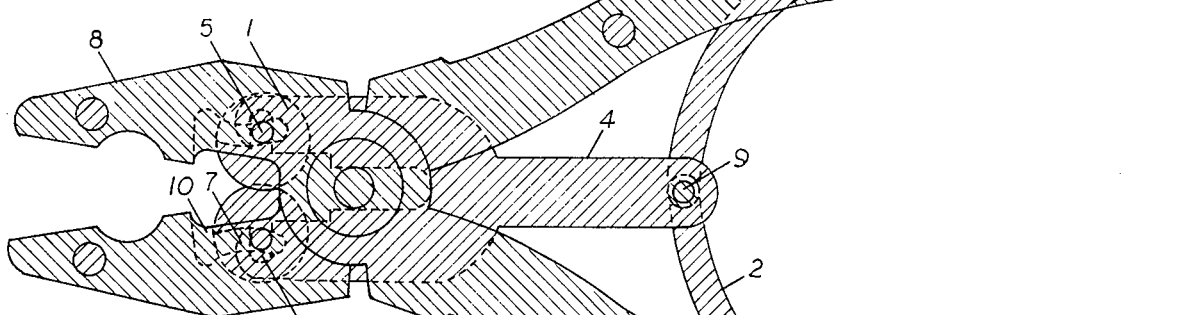
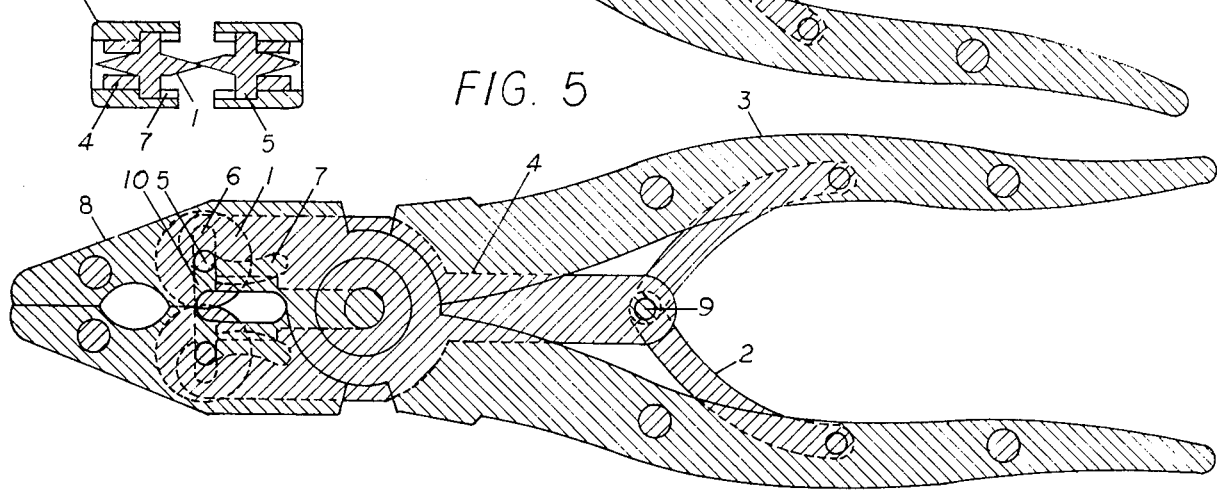

WIRE CUTTING PLIERS

IN THE DRAWINGS

FIG. 1 is a plan view of the pliers.

FIG. 2 is a cross sectional view with parts projected onto a plane represented by line 2 — 2.

FIG. 3 is a plan view.

FIG. 4 is an end view of the jaws and blades.

FIG. 5 is a plan view.

DESCRIPTION

FIG. 1 shows the pliers in open position with blades 1 retracted. As the pliers are closed, two arms 2 inside handles 3 exert a double toggle action on yoke 4, forcing it forward. Shafts 5 of blades 1 are engaged in slots 6 of yoke 4, and they ride in grooves 7 of jaws 8.

In FIG. 3 the blades 1 have closed, an initial action which is enough to cut a single wire ¼ inch in diameter. To cut double wire such as BX cable, the pliers are closed further and blades 1 roll forward, gripping the wire as they move, until a cut ⅜ inch in length has been made, as shown in FIG. 5. Only one third of the blade circumference has been used to make this cut.

FIG. 2 shows a riveted, laminated type of construction.

FIG. 4 shows the offset and overlapping of blades 1. Even a minimal overlap less than that shown (1/20th inch) would prolong the cutting capacity of the blades 1.

To replace blades 1, yoke pin 9 must be removed, thereby allowing jaws 8 to be opened without retracting blades 1. Blades 1 are then slipped out of removal groove 10 and new blades 1 are inserted.

Modification of design for bolt cutters would entail a lengthening of handles and a shortening of yoke so as to increase mechanical advantage. Only the initial cutting action that occurs when the blades are closed would be needed, thus the entire force expended could be concentrated in a relatively small angle of blade and jaw movement.

I claim:

1. Cutting pliers having crossed pivotally connected levers each with a handle on one end and a jaw on the other end, each jaw having groove means extending longitudinally of the jaws, rotatable opposed circular disk cutting blades with shafts, said groove means accommodate said shafts and guide the movement of the blades, a yoke having slots on one end to receive said shafts and the other end of the yoke pivotally connected to arms which pivotally connect to the handles whereby when the handles are closed the yoke will force the blades toward the end of the jaws.

2. Cutting pliers as in claim 1 wherein the blades are positioned on their shafts so as to permit a slight overlapping of the edges of the blades and thereby prevent separation of the blades as they wear.

3. Cutting pliers as in claim 1 wherein said groove means are curved to bring and keep the edges of the blades into contact as the jaws are closed.

4. Cutting pliers as in claim 1 wherein removal grooves extend from the longitudinal groove means to the opening between the jaws, to serve as means of removing cutting blades for replacement.

* * * * *